United States Patent [19]

Sugar

[11] 3,958,773

[45] May 25, 1976

[54] LOCK BAR ASSEMBLY FOR EMERGENCY SAFETY BELT RETRACTOR

[75] Inventor: Joseph Sugar, Los Angeles, Calif.

[73] Assignee: American Safety Equipment Corporation, New York, N.Y.

[22] Filed: May 20, 1974

[21] Appl. No.: 471,466

[52] U.S. Cl. .................................. 242/107.4 R
[51] Int. Cl.² .................................. B65H 75/48
[58] Field of Search ....... 242/107.4, 107 SB, 107 R; 280/150 SB

[56] References Cited
UNITED STATES PATENTS

| | | | |
|---|---|---|---|
| 3,740,000 | 6/1973 | Takada | 242/107.4 |
| 3,831,878 | 8/1974 | Griffin | 242/107.4 |
| 3,841,581 | 10/1974 | Salamon | 242/107.4 |
| 3,847,365 | 11/1974 | Carol | 242/55.2 |

*Primary Examiner*—Leonard D. Christian
*Attorney, Agent, or Firm*—Poms, Smith, Lande & Glenny

[57] ABSTRACT

The improved locking pawl mounting is for use in an emergency locking safety belt retractor mechanism wherein a locking pawl is pivotally mounted between a pair of spaced retractor frame sidewalls in position to engage a ratchet wheel locking member provided on the retractor wheel upon being pivoted by emergency responsive means associated with the retractor. The locking pawl mounting comprises a pair of circular bearing surfaces in the retractor frame in axially spaced relation. A pair of circular journal members, each being of a low coefficient friction material, are mounted to the locking pawl and are journaled in the bearing surfaces. Tab means are provided at each end of the locking pawl, and an aperture extends into each of the journal members for mating with the tabs so that rotation of the locking pawl causes corresponding rotation of the journal members. The locking pawl mounting further includes an axial thrust plate mounted on each of the journal members which extends between the frame sidewalls and the locking pawl to prevent axial displacement of the locking pawl relative to the frame sidewalls and to maintain a constant spaced relation therebetween. The axial thrust plate and the journal members are integral and rotate together so that the axial thrust plate pivots with rotation of the locking pawl. A slot is provided at each end of the locking pawl adjacent the sidewall for receiving the axial thrust plate therein.

3 Claims, 5 Drawing Figures

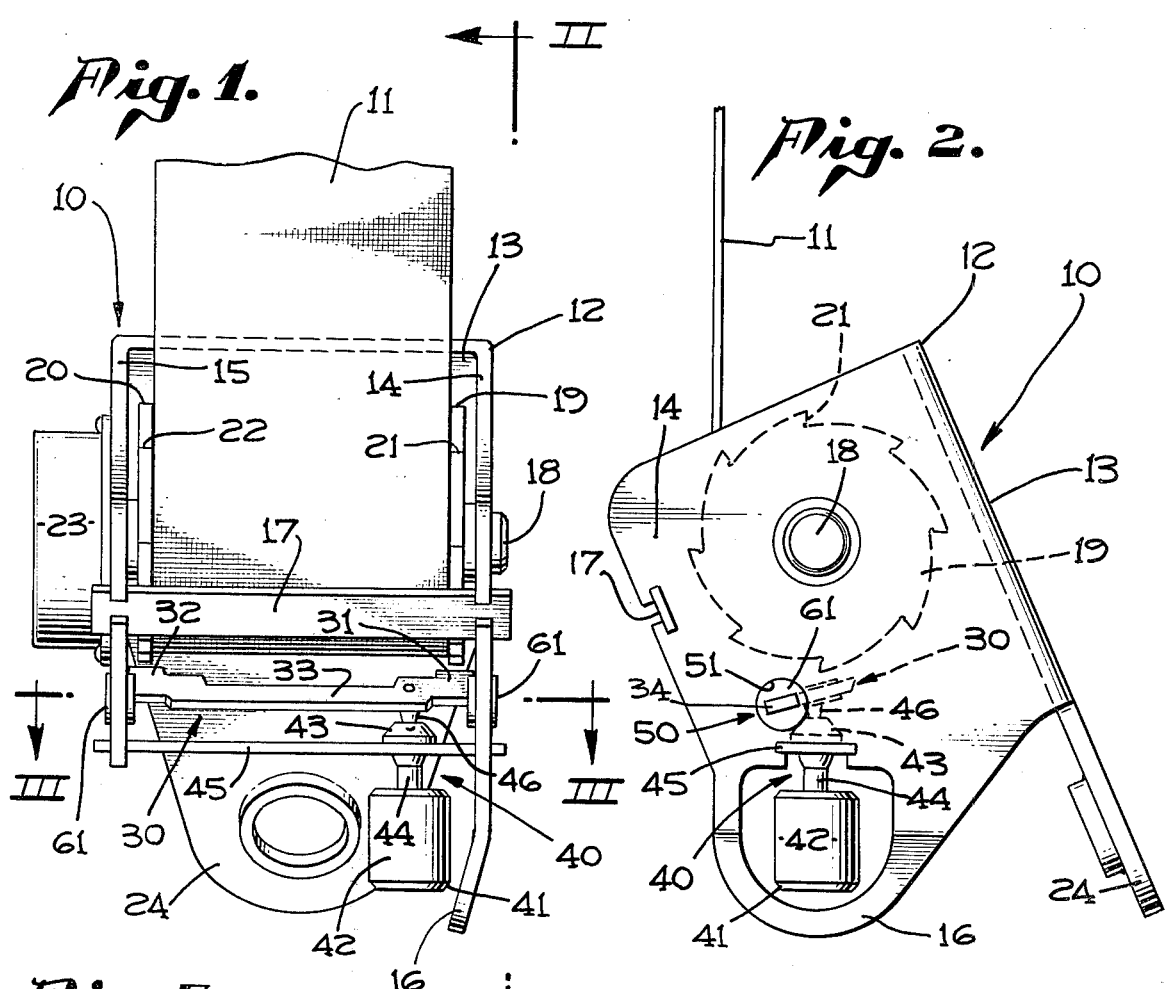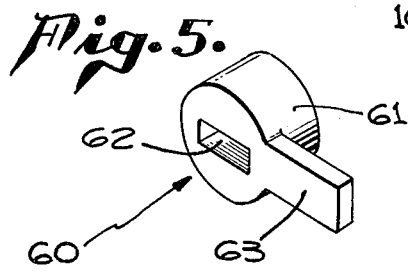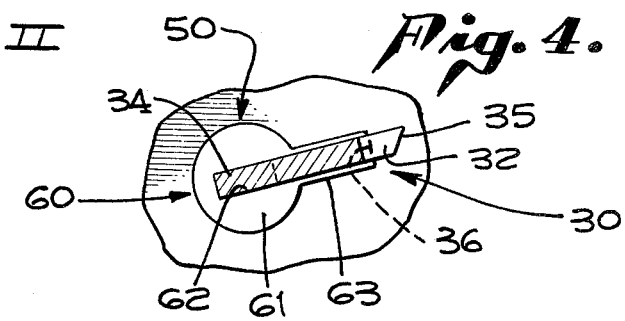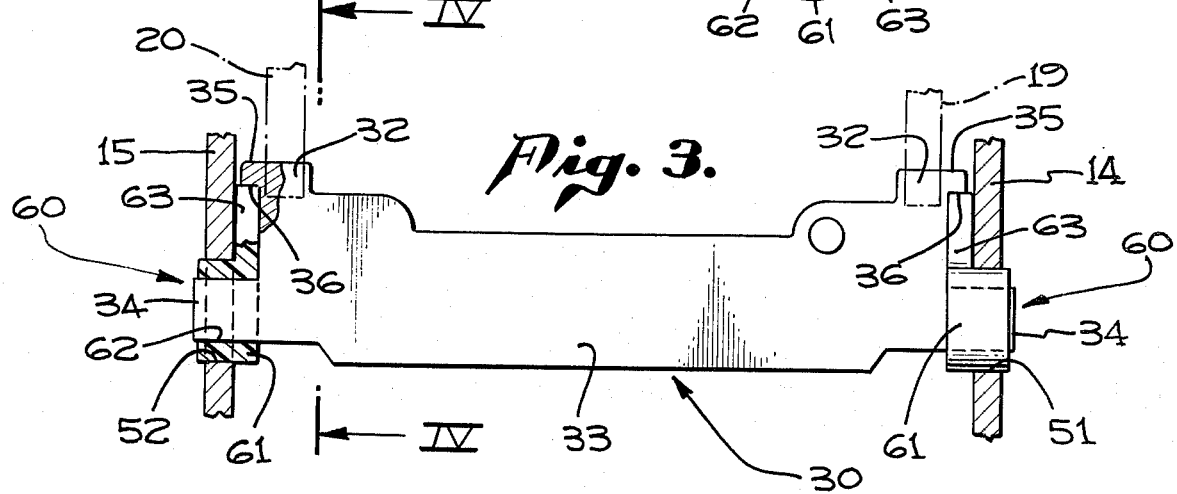

LOCK BAR ASSEMBLY FOR EMERGENCY SAFETY BELT RETRACTOR

BACKGROUND OF THE INVENTION

There are many types of emergency locking safety belt retractors for use in vehicles, and they generally can be divided into major classifications depending on how they lock. One type locks automatically by a slight retraction of the belt, and is maintained in the locking position at all times during use of the safety belt. The other two types are adapted to be normally unlocked so that the vehicle occupant is free to move about during normal operation of the vehicle. However, during sudden decelerations or changes in inertia, as during a crash, the retractors automatically lock to prevent further protraction of the safety belt webbing and to securely hold the vehicle occupants.

The normally unlocked retractor usually takes two different forms. The first form is belt sensitive and senses rapid movement of the passenger pulling on the belt. Upon sensing such rapid protraction of the belt from the reel, the retractor automatically locks preventing further safety belt protraction. A second form of automatic seat belt locking system is the inertia controlled system wherein the retractor automatically senses changes in the inertia of the vehicle and locks in response to sudden inertia changes. Retractors have also been developed which are both belt sensitive and vehicle sensitive and lock when either the vehicle undergoes a rapid change in inertia or the belt is protracted rapidly from a retractor reel.

The usual form for the retractor includes a frame with two upstanding sidewalls and a reel mounted between the upstanding sidewalls. Ratchet wheels are mounted on the ends of the reel and rotate with protraction and retraction of the safety belt. One or more locking bars are provided to engage the ratchet wheel. The locking bar is movable between an unlocked condition which allows free protraction of the safety belt from the reel and an emergency or locked position whereby the locking bar engages the ratchet wheels to prevent further protraction of the belt from the reel.

In order to maintain the maximum degree of safety, the locking bar must move rapidly between the unlocking condition and the emergency or locking condition. Any delay caused by friction or non-alignment of the locking bar in its mounting on the frame could cause a delay in the locking bar attaining its locked position with the ratchet wheel. Even a small delay may cause the belt to protract a sufficient distance so that it no longer holds the vehicle occupant as tightly as it should. If the occupant is not securely held, he may effect too much freedom of movement within the vehicle cabin during a crash and may be injured on the cabin interior.

In the prior art, the locking pawl normally has two ends extending through the frame. These ends lie generally in triangularly shaped holes and the locking pawl pivots at the apex of the triangle between the two adjacent sides. Usually the front of the triangle is an arch to accommodate the pivoting of the ends of the locking pawl. In order to assure unobstructed movement of the locking pawl from the unlocked position to the locked position, the triangularly shaped hole has had to be of close tolerances. Of course, any narrowing of tolerances increases manufacturing costs not only by increasing the cost of tooling and equipment necessary to meet the tolerances, but also in the cost of rejected parts which fail to meet more rigid specifications.

Not only is the size of the hole a crucial dimension, the lock pawl must fit between the spaced walls and must not be free to move about axially between the sidewalls. Only tabs extending from the side of the locking pawl extend through the triangular shaped holes and part of the lock bar extends adjacent to the inside of the sidewalls. Excess axial movement can cause the sides of the locking pawl to contact the inside of the sidewalls which would slow rotation of the locking pawl in an emergency and might prevent sufficiently rapid locking of the locking pawl.

Therefore, it is an object of the present invention to provide an improvement in a locking pawl mounting which will correct the problems associated with prior art devices. More specifically, it is an object of the present invention to provide a mounting for the locking pawl which will provide for ease of rotation between the locking pawl tabs and the axially aligned openings. A further object of the invention is to provide for smooth, non-interfering movement between the ends of the locking pawl and the sidewall. A further object of the invention is to provide a low-cost locking pawl mounting which eliminates the need for extremely strict tolerances in the retractor mounting. Still a further object of the invention is to provide a mounting which will remain reliable within increasing age and will not wear fast. A further object of the invention is the elimination of excess noise caused by movement of the locking pawl relative to the sidewalls and movement of the tabs of the locking pawl within the axially aligned holes of the sidewalls. Other objects will become evident in the foregoing description of the preferred embodiment of the invention.

SUMMARY OF THE INVENTION

In an emergency locking safety belt retractor mechanism for use in a vehicle, a locking pawl is privotally mounted between a pair of spaced retractor frame sidewalls in position to engage a ratchet wheel locking member provided on the ratchet wheel upon being pivoted by emergency responsive means associated with the retractor. The retractor has been improved by improving the locking pawl mounting in a manner which provides a pair of circular bearing surfaces in the retractor frame in axially spaced relation and a pair of circular journal members, each being of a low coefficient friction material, mounted to the locking pawl and being journaled in the bearing surfaces. The locking pawl further comprises a tab on each side of the locking pawl. An aperture extends into each journal member for mating with the tabs so that rotation of the locking pawl causes corresponding rotation of the journal members. An axial thrust plate, which is preferably integral wtih the journal members for rotation together whereby the axial thrust plate pivots with rotation of the locking pawl, extends between the frame sidewalls and the locking pawl to prevent axial displacement of the locking pawl relative to the frame sidewalls and for maintaining a constant spaced relation therebetween.

BRIEF DESCRIPTION OF THE DRAWINGS

FIG. 1 is a front view of the preferred embodiment of the emergency locking safety belt retractor including the improved locking pawl mounting of the present invention.

FIG. 2 is a side view of the retractor looking from the plane II—II.

FIG. 3 is a cross-sectional view showing the improved locking pawl mounting and is taken along plane III—III in FIG. 1.

FIG. 4 is a cross-sectional view taken along plane IV—IV in FIG. 3.

FIG. 5 is a perspective view of the exemplary embodiment of a circular journal member with an axial thrust plate means mounted thereon which is part of the locking pawl mounting of the instant invention.

DETAILED DESCRIPTION OF THE PREFERRED EMBODIMENT

The locking pawl mounting of the instant invention is mounted in an emergency locking safety belt retractor mechanism for use in vehicles wherein a locking pawl is pivotally mounted between a pair of spaced retractor frame sidewalls in position to engage a ratchet wheel locking member provided on the retractor reel upon being pivoted by emergency responsive means associated with the retractor. As discussed above, the locking pawl mounting may be used in manually operated safety belt retractors, in belt acceleration sensitive retractors, or in vehicle inertia responsive retractors. In the exemplary embodiment, the novel improved locking pawl mounting is shown in an inertia responsive safety belt retractor.

Referring now to FIGS. 1 and 2, the safety belt retractor in which the improved locking pawl mounting is used is shown generally at 10 and comprises a frame 12 with a base 13 and sidewalls 14 and 15. A brace member 17 serves to hold the two sidewalls both parallel and at the prescribed distance. A reel (not shown) is mounted between the sidewalls and rotates about axle 18. Safety belt webbing 11 is wound about the reel, and a spring mounted in housing 23 urges the belt to its retracted or coiled condition by urging the reel in a counterclockwise direction as shown in FIG. 2.

Ratchet wheel locking members 19 and 20 are mounted for rotation with rotation of the reel. The ratchet wheel locking members include teeth 21 and 22 about the ratchet wheel locking member which are engaged by the locking pawl in a manner to be discussed hereinafter.

In addition, the frame 12 includes a mounting member 24 for attaching the safety belt retractor to the vehicle in a correct orientation.

The locking pawl is pivotally mounted between the spaced retractor frame sidewalls. In the preferred embodiment, the locking pawl 30 is pivotally mounted for rotation between an unlocked condition shown in FIG. 2 wherein the locking pawl does not contact the teeth of the ratchet wheel 19 and a locked position wherein the locking pawl 30 pivots counterclockwise in FIG. 2 into engagement with the teeth of the ratchet. In the exemplary embodiment, the locking pawl comprises engaging portions 31 and 32 which engage the teeth of the ratchet wheel. A locking bar portion 33 connects the two engaging portions so that they pivot together thereby engaging the aligned teeth of the ratchet wheel members.

The locking pawl is pivoted by emergency responsive means associated with the retractor. In the exemplary embodiment, the emergency responsive means 40 includes a pendulum which pivots during changes in inertia of the vehicle to pivot the locking pawl into its locked position with the ratchet wheel members. The pendulum 41 comprises a mass 42 which is connected to an actuator 43 by a stem 42. The actuator 43 rests on support plate 45 which is supported by the frame sidewalls 14 and 15. There is an aperture (not shown) through the support plate 45 and the pendulum is free to swing about the actuator. As the mass moves from its FIG. 2 rest position, because of a change in inertia of the vehicle, it will cause the actuator 43 to pivot about its periphery on the support plate 45. This action causes the center to move upward (FIG. 2) and the upward movement pushes against the protruding member 46 which is connected to the locking bar 33 on the locking pawl. The upward movement causes the locking pawl to pivot in a counterclockwise direction so that it engages a tooth of the ratchet wheel 19 to prevent further rotation in the clockwise direction of the ratchet wheel and prevent further uncoiling of the safety belt from the reel. A depending portion 16 of the sidewall 14 extends downward beyond the mass to protect the mass from contacting vehicle parts or a cover about the retractor to maintain freedom of movement to the pendulum system.

The above-described emergency locking safety belt retractor has been improved by improving the locking pawl mounting. The improved locking pawl mounting comprises the provision of a pair of circular bearing surfaces in the retractor frame in axially spaced relation and an pair of circular journal members, each being of a low coefficient of friction material, mounted to the locking pawl and being journaled in the bearing surfaces. In the exemplary embodiment, the circular bearing surfaces 50 include a pair of aligned circular apertures 51 and 52 in the sidewalls 14 and 15 respectively. These circular apertures are in contrast to the prior art mounting wherein the locking pawl is held for rotation in triangular-like apertures. In the exemplary embodiment, the pair of circular journal members 60 each includes a journal portion 61 which is journaled into the bearing surfaces 50. In the exemplary embodiment, the journal members are made of a low coefficient friction material, preferably a plastic which is tough and resistant to deformation because the journal members bear load in the invention.

Because of the low coefficient of friction of the plastic material, the frictional forces between the bearing surfaces and the journal members are kept at a minimum. Moreover, the tolerances become somewhat less critical because of the decrease in friction, but because of the increased ease in manufacturing the plastic journal members to closer tolerances, closer tolerances between the journal member and the bearing surfaces are maintained.

The improved locking pawl further comprises tab means on the locking pawl and aperture means extending into the journal members. The aperture means mate with the tab means so that rotation of the locking pawl causes corresponding rotation of the journal members. In the preferred embodiment, the tab means 34 extends from both sides of the locking bar 33 and extends through circular apertures 51 and 52 through the sidewalls 14 and 15. With the exception of edge portion 35 of the locking pawl 30 which is pointed for engaging properly the teeth of the ratchet wheel 19 and 20, the locking pawl is generally planer and in the exemplary embodiment the tabs 34 are of the same thickness and extend in the same plane as the remainder of the locking pawl 30. Aperture means 62 extend into the journal members, and in the exemplary embodiment, the aperture extends completely through the journal members and becomes a hole therethrough. The aperture means 62 is generally of the same shape as the tab means so that the tab means is held securely in the journal member when the tabs are inserted in the aperture means 62. Because the plastic is somewhat resilient, a tight fit can be established between the two pieces and the secure grip which the aperture in the journal member has on the tab means prevents movement of the tab means within the journal members. This insures that the locking pawl will remain aligned with the ratchet wheel members and eliminate noise in the operation of the locking pawl.

Axial thrust plate means is mounted to the journal member and extends between the frame sidewalls and the locking pawl for preventing axial displacement of the locking pawl relative to the frame sidewalls and for maintaining a constant spaced relation therebetween. In the exemplary embodiment, the axial thrust plate 63 is mounted to the journal member 60. Referring now to FIG. 3, the axial thrust plate is located between the ends of the locking pawl and the sidewalls. In the exemplary embodiment, the axial thrust plate is slightly wider than the thickness of the locking pawl. The axial thrust plate is a load bearing surface and bears axial loads from the locking pawl to the sidewalls. Without the axial thrust plate, if the locking pawl undergoes axial movement, the side of the locking pawl would contact the sidewall. This metal to metal contact would cause friction between the two parts and cause slower movement of the locking pawl to its locked position. By interposing the axial thrust plate, axial forces are transmitted from the locking pawl through the axial thrust plate to the sidewall.

The axial thrust plate means and the journal members are integral for rotation together whereby the axial thrust plate pivots with rotation of the locking pawl. In the preferred embodiment, the journal member and the axial thrust plate are formed of one-piece plastic of the same material. Therefore, the material interposed between the sidewall and the locking pawl is the same low coefficient material as the journal member and serves to minimize friction between the locking pawl and the sidewalls. Moreover, because the axial thrust plate is integral with the journal member, it rotates upon rotation of the journal member and always remains interposed between the locking pawl and the sidewall. The axial thrust plate slides on the sidewall to minimize friction. If the axial thrust plate did not rotate with the journal member, rotation of the locking pawl with respect to a stationary plastic member might cause an edge of the locking pawl to catch on the axial thrust plate plastic surface. Therefore, it is considered advantageous that the movement be between the axial thrust plate and the sidewall rather than between the axial thrust plate and the locking pawl. Also, because the axial thrust plate rotates with the journal member, it can be of a small width, and in the exemplary embodiment, is slightly wider than the thickness of the locking pawl. It is certainly advantageous to limit the size of the axial thrust plate in order to save on plastic material which would be wasted if a plastic thrust plate had to be provided to cover the entire travel path of the locking pawl.

Slot means in the end of the locking pawl adjacent the sidewalls receive the axial thrust plate therein. In the exemplary embodiment, the slot means 36 are cut out of the ends of the locking pawl to receive the axial thrust plate within the slot. By having the slot, it allows the locking pawl engaging portions 31 and 32 to be maintained at their present width. This width is standard in the industry and it is advantageous to maintain the width as standard.

Thus, an improved locking pawl mounting for use in an emergency locking safety belt retractor has been shown which decreases the probability that the locking pawl will be slowed in its travel to the locked position because of friction between the sidewall mounting or because of friction between the side of the locking pawl and the sidewalls. The locking pawl mounting eliminates the need for extremely close tolerances in existing emergency locking safety belt retractors and is relatively low in cost and highly reliable.

I claim:

1. In an emergency locking safety belt retractor mechanism for use in vehicles wherein a locking pawl is pivotally mounted between a pair of spaced retractor frame sidewalls in position to engage a ratchet wheel locking member provided on the retractor reel upon being pivoted by emergency responsive means associated with the retractor, a pair of circular bearing surfaces in said retractor frame in axially spaced relation; and a pair of circular journal members, each being of a low coefficient of friction material, mounted to said locking pawl and being journaled in said bearing surfaces, the improvement in locking pawl mounting comprising the provision of:

axial thrust plate means mounted to said journal members and extending between the frame sidewalls and said locking pawl for preventing axial displacement of said locking pawl relative to said frame sidewalls and for maintaining a constant spaced relation therebetween.

2. The improved locking pawl mounting of claim 1 further comprising the provision of:

a. slot means in the ends of said locking pawl adjacent said sidewalls for receiving said axial thrust plate therein.

3. The improved locking pawl mounting means of claim 1 further comprising the provision of:

a. said axial thrust plate means and said journal members being integral for rotation together whereby said axial thrust plate pivots with rotation of said locking pawl.

* * * * *